(No Model.)
C. A. SHULTZ.
BRICK MOLD.
No. 511,098.        Patented Dec. 19, 1893.
Fig: 1.
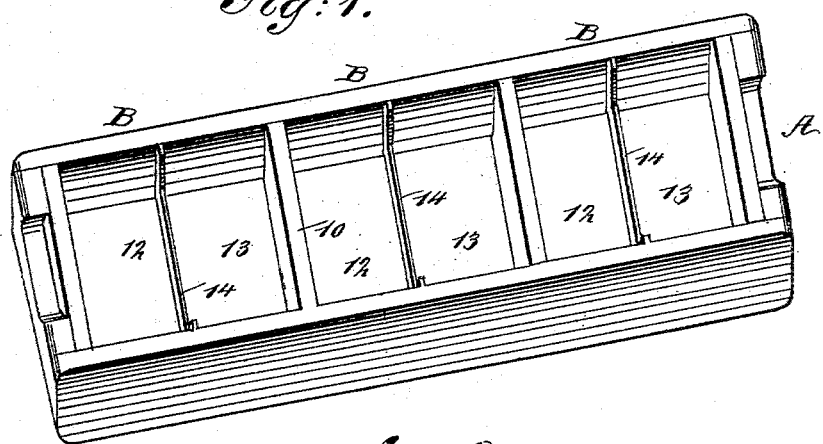
Fig: 2.
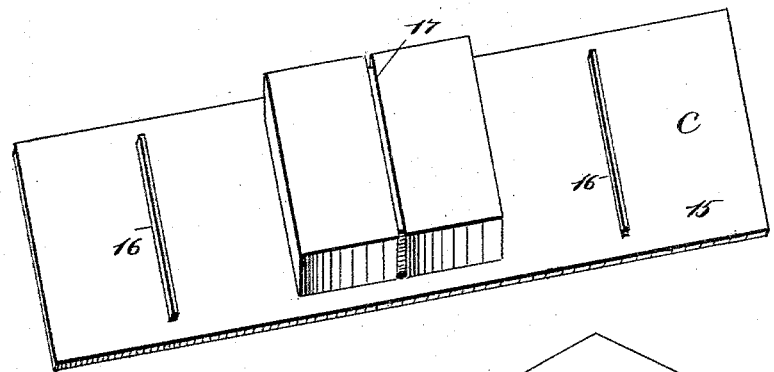
Fig: 3.
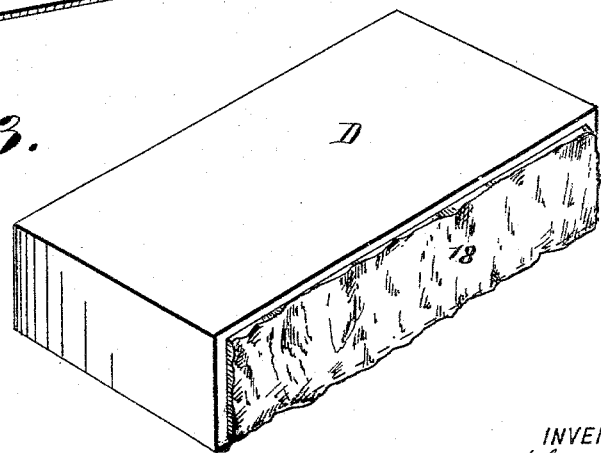
WITNESSES:
Chas. O. Nida
C. Sedgwick
INVENTOR
C. A. Shultz
BY Munn & Co.
ATTORNEYS.

UNITED STATES PATENT OFFICE.

CHARLES A. SHULTZ, OF RONDOUT, NEW YORK.

BRICK-MOLD.

SPECIFICATION forming part of Letters Patent No. 511,098, dated December 19, 1893.

Application filed July 26, 1893. Serial No. 481,477. (No model.)

*To all whom it may concern:*

Be it known that I, CHARLES A. SHULTZ, of Rondout, in the county of Ulster and State of New York, have invented a new and Improved Brick-Mold, of which the following is a full, clear, and exact description.

My invention relates to an improvement in brick molds, and it has for its object to provide a mold capable of being used in any brick machine, which mold is especially adapted for the manufacture of rock-faced brick.

A further object of the invention is to provide a mold in which rock-faced brick may be made, which will be exceedingly simple, durable and economic in its construction, and which may likewise be handled as expeditiously and conveniently as a mold for producing ordinary brick.

The invention consists in the novel construction and combination of the several parts, as will be hereinafter fully set forth and pointed out in the claim.

Reference is to be had to the accompanying drawings forming a part of this specification, in which similar figures and letters of reference indicate corresponding parts in all the views.

Figure 1 is a perspective view of the mold. Fig. 2 is a perspective view of the pallet, and bricks produced in the improved mold resting thereon; and Fig. 3 is a perspective view of a rock-faced brick produced by the mold.

In carrying out the invention the body of the mold A, may be of any approved shape; preferably, however, it is formed as shown in the drawings, in which it is rectangular in cross section, and of greater length than width.

The body of the mold is divided into a series of compartments B, by means of transverse partitions 10, which extend from side to side, and each compartment B, is adapted for the formation of two bricks, since in this form of mold the bricks are molded in pairs. Each compartment B, is divided practically into two sub-compartments 12 and 13 by means of a rib 14, the latter being practically rectangular in cross section, and it extends along each side wall of the mold, and across the bottom thereof.

In connection with the aforesaid mold a pallet C, may be employed if in practice it is found desirable. The pallet comprises preferably a flat body 15, smooth on one side and having transverse ribs 16, on the other side. These ribs are of a length of the brick or the internal width of the mold, less the thickness of the ribs of the mold.

In the operation of molding bricks by means of the above described mold, the plastic material is pressed into the compartments of the mold in the usual way, whereupon it will be observed that twin bricks are made in each compartment, a brick being formed in each sub-compartment, and the bricks in connecting sub-compartments are perfect upon the top and bottom and end surfaces and likewise upon one side surface, but the two bricks made in one compartment B, will be connected at their inner faces a predetermined distance back of their end surfaces and below their top surfaces, or above their bottom surfaces, since the rib 14 will form a channel 17 in both end faces and in what is the under side of the brick when in the mold, the channel defining the two bricks of a pair. These bricks, connected in the manner above set forth, are placed if desired upon a flat surface with the channel 17 uppermost; and after the brick has become dried to a predetermined degree, one brick is separated from the other by breaking them apart along the line of the channel 17, whereupon a rock-face 18 will be made, as shown in Fig. 3, upon one surface of the bricks D, and at the rock face a plain smooth margin will be formed upon three sides thereof. If a plain smooth margin is desired to be formed all around the sides of the brick upon which the rock face is made, thus making the rock face a central panel, this may be done by placing the twin bricks, after they have been taken from the mold, upon the pallet C in such manner that a rib 16, will enter the bottom surface of the united bricks on the line of the channel 17.

It will be observed that a mold constructed as above set forth will enable bricks with rock faces to be made in any of the many forms of brick making machines, and that such rock-faced bricks may be made practically as economically and as rapidly as bricks of the ordinary character.

Having thus described my invention, I claim as new and desire to secure by Letters Patent—

In a brick mold, the combination with a rectangular body divided into compartments, each compartment being adapted to accommodate two bricks, and each compartment being provided with a division rib extending transversely across the bottom and up the sides flush with the upper surface of the mold, the rib being continuous and dividing the compartment into two communicating sub-compartments, of a pallet adapted to receive the bricks when removed, said pallet having one smooth side and provided with transverse ribs on the other side, the ribs being of a length equal to the length of the brick or the internal width of the mold, less the thickness of the ribs of the mold, and adapted for engagement with the molded brick opposite the section engaged by the ribs of the mold, whereby provision is made for making a groove on all four sides of the brick, or only on three sides thereof, as and for the purpose set forth.

CHARLES A. SHULTZ.

Witnesses:
JANSEN HASBROUCK,
MARKS JACOBS.